March 1, 1955

C. J. KEIM ET AL 2,703,162

CLUTCH CONTROL SYSTEM

Filed June 10, 1953

Inventors:
CHARLES J. KEIM and
MICHAEL L. RIZZONE,
by: Donald G. Dalton
their Attorney.

March 1, 1955
C. J. KEIM ET AL
2,703,162
CLUTCH CONTROL SYSTEM
Filed June 10, 1953
2 Sheets-Sheet 2
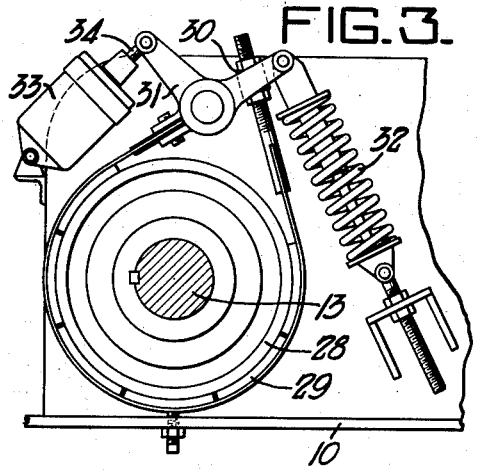
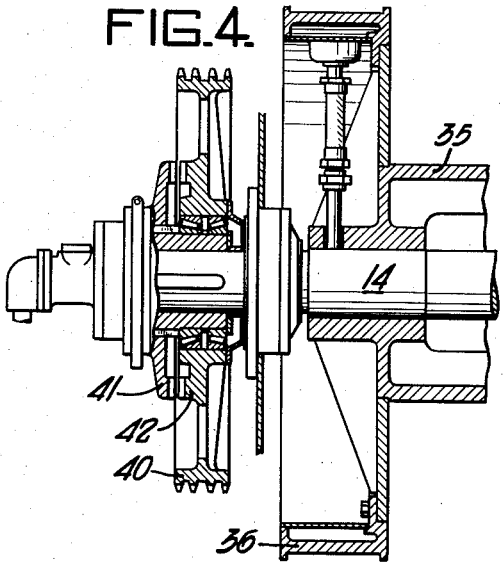
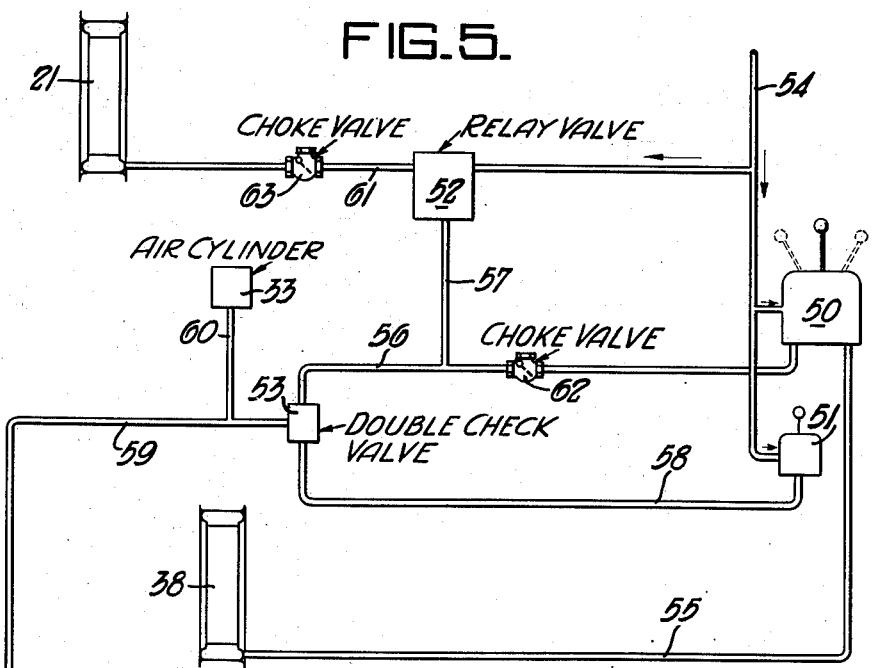
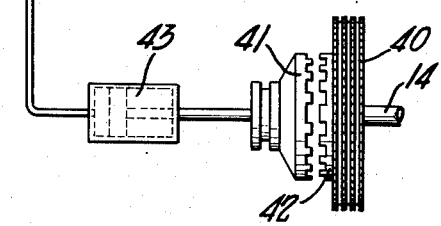
Inventors:
CHARLES J. KEIM and
MICHAEL L. RIZZONE,
by: Donald G. Dalton
their Attorney.

United States Patent Office 2,703,162
Patented Mar. 1, 1955

2,703,162

CLUTCH CONTROL SYSTEM

Charles J. Keim, Oil City, Pa., and Michael L. Rizzone, Houston, Tex., assignors to United States Steel Corporation, a corporation of New Jersey Application June 10, 1953, Serial No. 360,753

7 Claims. (Cl. 192—12)

This invention relates to an improved control system for clutches and brakes.

Our control system is especially suited for the well-drilling drawworks shown in our copending application, Serial No. 355,258, filed May 15, 1953, and to facilitate describing it we show it embodied in this drawworks. Nevertheless the same control system obviously can be used in other apparatus where similar problems are encountered, including other forms of drawworks. Therefore our description should be construed as only an example of its use, and not as limiting the invention.

An object of the invention is to provide an improved pressure operated system for controlling the engagement of two clutches and assuring that a particular one of them always engages ahead of the other.

A further object is to provide an improved pressure operated system for controlling a positive clutch, an impositive clutch and a normally applied brake, said system assuring that the positive clutch engages while its elements are motionless, and that the positive clutch engages and the brake releases before the impositive clutch engages.

A further object is to provide an improved control system which has the foregoing characteristics and is operated by a single lever, but has a separate means for engaging the positive clutch and releasing the brake when engagement of the impositive clutch is not desired.

A further object is to provide, in combination with a drawworks like that shown in our aforementioned application, an improved control for driving the hoist drum from the low-drive shaft, which control always engages the jaw clutch between the shaft and drum while these parts are motionless, and thereafter engages the inflatable clutch for driving this shaft, all through a single operating lever.

In accomplishing these and other objects of the invention, we have provided improved details of structure, a preferred form of which is shown in the accompanying drawings, in which:

Figure 3 is a vertical sectional view on line III—III of Figure 2;

Figure 4 is a vertical sectional view of a portion of the drum shaft and the positive clutch thereon; and Figure 5 is a schematic view of the control system of the present invention.

Figure 1:
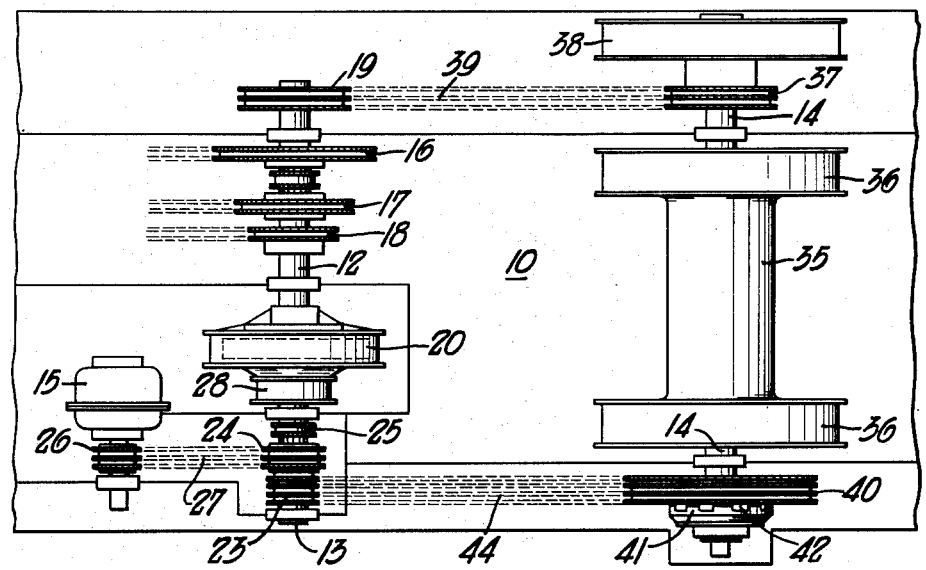
Figure 1 is a schematic top plan view of a portion of a drawworks for which the control system of the present invention is particularly suited.

Figure 1 shows schematically a portion of a drawworks like that shown in our aforementioned application. Parts not necessary for an understanding of the present invention are omitted in the interest of simplicity. This drawworks comprises a base 10 on which are rotatably mounted an output shaft 12, a low-drive shaft 13 axially aligned therewith, a drum shaft 14 parallel to the first two shafts, and a hydraulic brake 15 on the opposite side of the low-drive shaft. In practice the base would also carry other mechanisms, such as an input shaft, reverse gearing, a cathead and sand reel, and a rotary countershaft, but these mechanisms are not shown since they are not involved in the present invention.

The output shaft 12 carries a low-speed drive sprocket 16, an intermediate-speed drive sprocket 17 and a high-speed drive sprocket 18. Thus the output shaft can be driven through any one of these sprockets through mechanism not shown to furnish three forward operating speeds. The mechanism which connects the output shaft with the drum shaft furnishes a high speed and a low speed drive, making six speeds in all, as hereinafter explained. The output shaft has a free end portion on which a sprocket 19 is keyed. The other end of the output shaft carries an annular flange 20, on the inside of which is mounted an inflatable bag or tube 21 (Figure 2), forming one element of an impositive clutch. The shaft has suitable ducts and connections, which are shown only schematically in the circuit diagram, for transmitting compressed air to the bag 21.

Figure 2:
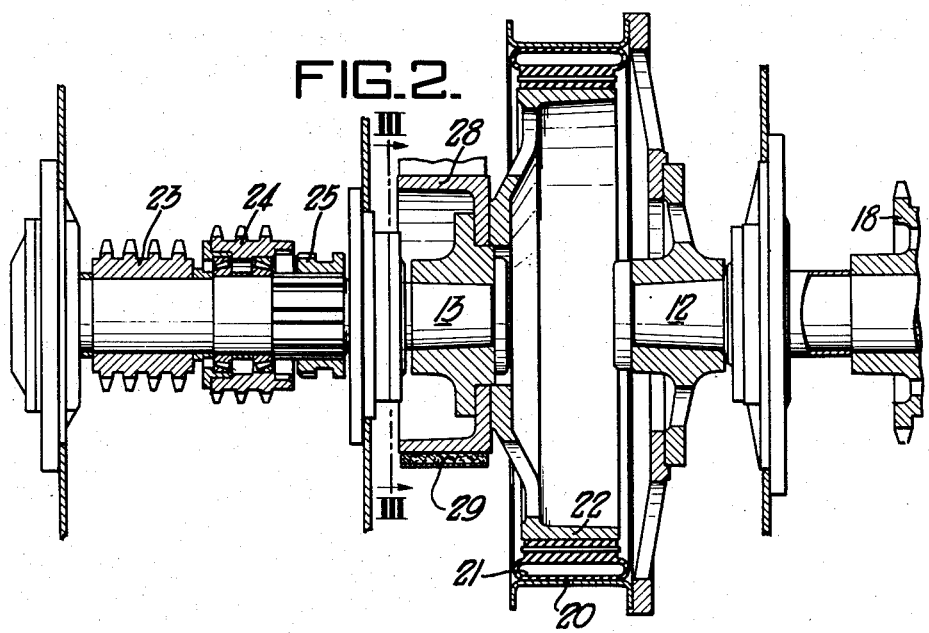
Figure 2 is a vertical sectional view of the low-drive shaft and the clutch which connects this shaft with the output shaft.

The end of the low-drive shaft 13 adjacent the output shaft 12 carries a clutch drum 22 which fits within the bag 21 and forms the other element of an impositive clutch (Figure 2). The low-drive shaft also carries a multiple sprocket 23 which is keyed thereto, a multiple sprocket 24 which is freely rotatable thereon, and a spline clutch 25 for establishing a driving connection with the latter sprocket. The sprocket 24 is aligned with a multiple sprocket 26 on the hydraulic brake 15 (Figure 1) and drivingly connected thereto through chains 27. An inertia brake drum 28 is fixed to the shaft 13 and has a cooperating brake band 29 which is spring applied and air released.

Figure 3 shows an exemplary operating means for the brake band 29. The band is dead-ended to the drawworks frame at 30. The live end of the band is connected to a bell crank 31 which is pivoted to the frame. A compression spring 32 is connected between abutments on one arm of said bell crank and on the frame and continuously urges the bell crank counterclockwise to apply the brake. A fluid pressure cylinder 33 is pivoted to the frame and contains a reciprocable piston and rod 34 which is pivoted to the other arm of the bell crank. When fluid pressure forces the piston outwardly relative to the cylinder, the bell crank turns clockwise against the action of the spring to release the brake.

The drum shaft 14 carries a hoist drum 35, the end portions of which have brake drums 36. These brake drums have cooperating brake bands, which are not shown since they are not involved in the invention. A multiple sprocket 37 is freely mounted on the drum shaft 14 at one end of the hoist drum and can be drivingly connected thereto through engagement of an inflatable clutch 38. The sprocket 37 on the drum shaft is aligned with the sprocket 19 on the output shaft 12 and is drivingly connected thereto through chains 39. A multiple sprocket 40 (Figure 4) is freely mounted on the other end portion of the drum shaft. A clutch jaw 41 is slidably mounted on the drum shaft and forms one element of a positive clutch. The sprocket 40 carries cooperating clutch teeth 42 forming the other element of this clutch for establishing a driving connection between the sprocket 40 and shaft 14. The clutch element 41 is biased to disengage automatically, but can be engaged by applying pressure to an operating cylinder 43, shown only schematically in the circuit diagram hereinafter described. Since clutches of this type per se are well known, no detail showing is made. The sprocket 40 on the drum shaft is aligned with the sprocket 23 on the low-drive shaft 13 and drivingly connected thereto through chains 44 (Figure 1).

For driving the drum shaft 14 and hoist drum 35 in any of the three higher speeds, the inflatable clutch 38 is engaged, and the drive is via sprockets 19 and 37 and chains 39; the positive clutch 41, 42 and impositive clutch 21, 22 both are disengaged and the inertia brake 28, 29 is applied. For driving the drum shaft 14 and hoist drum 35 in any of the three lower speeds, these latter clutches are engaged, and the drive is via sprockets 23 and 40 and chains 44; the clutch 38 is disengaged and the inertia brake 28, 29 is released. For utilizing the hydraulic brake 15 to retard rotation of the hoist drum 35, the positive clutch 41, 42 and the spline clutch 25 both are engaged, and the connection between the drum shaft and the brake is via sprockets 40, 23, 24 and 26 and chains 44 and 27; the impositive clutch 21, 22 and the inflatable clutch 38 both are disengaged and the inertia brake 28, 29 is released. The control system of the present invention is especially suited for operating the positive clutch 41, 42, the impositive clutch 21, 22 and the inertia brake 28, 29 of this drawworks, although its use is not thus limited, as already explained.

The low-drive shaft 13 can rotate quite rapidly when it is used to connect the drum shaft 14 to the hydraulic brake 15 when lowering a drill string. After the spline clutch 25 and jaw clutch 41, 42 are disengaged, momentum tends to spin the low-drive shaft and also the sprockets 23 and 40, but automatic application of the inertia brake 28, 29 prevents such spinning. If subsequently it is desired again to drive the hoist drum through the low-drive shaft, there is no delay while waiting for the parts to stop. To drive the hoist drum through the low-drive shaft, the positive clutch 41, 42 must engage while its elements remain substantially motionless, and it must engage and the inertia brake must release before the impositive clutch 21, 22 engages to establish a driving connection from the output shaft 12. This sequence of operations can occur, for example, in "going into the hole." As the drill string is actually lowered, rotation of the hoist drum 35 is retarded both by partial application of the brakes 36 and by the hydraulic brake 15. After the drill string is lowered the length of one stand, the drum is stopped and a set of rotary slips are inserted to support the drill string from the rotary table. The traveling block of the drilling rig is disconnected from the drill string, raised as rapidly as possible through the high-speed drive, and connected to the next stand, which is then joined to the drill string. Next the hoist drum is operated at a low speed to raise the drill string sufficiently to release the slips, after which the string is lowered as before. Automatic application of the inertia brake assures that the low-drive shaft comes to a stop before it is used in thus raising the drill string, and the control system of the present invention assures that the clutches engage and the brake releases in the proper sequence.

As shown in Figure 5, our control system includes a valve-type clutch controller 50, a valve-type hydraulic brake controller 51, a relay valve 52 and a double check valve 53. The clutch controller 50 has a neutral position and "high" and "low" operating positions. The hydraulic brake controller has "on" and "off" positions. The controllers and valves per se can be of any standard or desired construction and hence are not shown in detail. An air supply line 54 is connected to the inlet side of the two controllers and the relay valve. The "high" side of the clutch controller 50 is connected to the clutch 38 via an air line 55. The "low" side of the clutch controller is connected to one of the inlets of the double check valve 53 and to the operating port of the relay valve 52 via an air line 56 and a branch 57. The hydraulic brake controller 51 is connected to the other inlet of the double check valve via an air line 58. The outlet from the double check valve is connected to the operating cylinders 43 and 33 for the positive clutch 41, 42 and the inertia brake 28, 29 respectively via an air line 59 and a branch 60. The outlet from the relay valve 52 is connected to the bag 21 of the impositive clutch 20, 21 via an air line 61. Preferably the lines 56 and 61 contain choke valves 62 and 63 which restrict the flow of air into the cylinders 43 and 33 and clutch bag 21, but permit substantially unrestricted discharge therefrom.

To drive the drum shaft 14 at any of the three lower speeds, the operating lever of the clutch controller 50 is moved to its "low" position in which it admits compressed air through line 56 and branch 57 to the inlet of the double check valve 53 and the control port of the relay valve 52. The double check valve admits this air through the line 59 and branch 60 to the operating cylinders 43 and 33, where it acts to engage the positive clutch 41, 42 and release the brake 28, 29. The relay valve 52 is timed to act more slowly. After the pressure in cylinders 43 and 33 has built up to a predetermined value sufficient to release the brake 29 and engage clutch 41, the relay valve admits air from the supply line 54 to the line 61 and thence to the clutch bag 21 to engage the impositive clutch 21, 22, and thus complete the driving connection from the output shaft 12 to the drum shaft 14 via the low-drive shaft 13. To break this driving connection, the controller 50 merely is returned to its neutral position, allowing the air to discharge from the cylinders 43 and 33 and clutch bag 21. The spring 32 applies the brake 28, 29 automatically. To drive the drum shaft at any of the three higher speeds, the operating lever of the clutch controller 50 is moved to its "high" position in which it admits compressed air through line 55 to the clutch 38.

To operate the hydraulic brake 15, the controller 51 is moved to a position to admit compressed air from the supply line 54 to the line 58 and thence to the other inlet of the double check valve 53. This valve now allows air to flow to cylinders 43 and 33 and thus engages the positive clutch 41, 42 and releases the inertia brake 28, 29. Any desired means can be employed for engaging the spline clutch 25 to complete the driving connection between the hoist drum and the hydraulic brake.

From the foregoing description it is seen that our invention affords a virtually fool-proof and simplified clutch operating means. A single lever on the clutch controller engages both a positive clutch and an impositive clutch and releases an inertia brake all in proper sequence. It is also possible to engage the positive clutch and release the brake by other means which do not operate the impositive clutch.

While we have shown and described only a single embodiment of the invention, it is apparent that modifications may arise. Therefore we do not wish to be limited to the disclosure set forth but only by the scope of the appended claims.

We claim:

1. The combination with a rotatable element and a positive clutch, an impositive clutch and a normally applied brake operatively connected thereto, said clutches being adapted to engage and said brake to release on application of fluid pressure thereto, of a control system comprising a source of fluid under pressure, a valve having its inlet connected to said source and its outlet connected to both said positive clutch and said brake for engaging this clutch and releasing the brake when the valve is opened, a relay valve having its inlet connected to said source and its outlet connected to said impositive clutch, and means connecting the outlet of said first named valve with said relay valve for operating the latter to engage said impositive clutch after said positive clutch engages.

2. The combination with a rotatable element and a pair of clutches operatively connected thereto, of a control system comprising a source of fluid under pressure, an actuating valve having its inlet connected to said source, a double check valve having one inlet connected to said actuating valve and an outlet connected to one of said clutches, a relay valve having its inlet connected to said source and its outlet connected to the second of said clutches, means connecting the outlet of said actuating valve with said relay valve for operating the latter and engaging said second clutch after said first clutch engages, and a second actuating valve having its inlet connected to said source and its outlet connected to the other inlet of said double check valve for engaging said first clutch independently of said second clutch.

3. The combination with a rotatable element and a positive clutch, an impositive clutch and a normally applied brake operatively connected thereto, said clutches being adapted to engage and said brake to release on application of fluid pressure thereto, of a control system comprising a source of fluid under pressure, an actuating valve having its inlet connected to said source and its outlet connected to both said positive clutch and said brake for engaging this clutch and releasing the brake when the valve is opened, a relay valve having its inlet connected to said source and its outlet connected to said impositive clutch, means connecting the outlet of said actuating valve with said relay valve for operating the latter to engage said impositive clutch after said positive clutch engages, and alternative means for engaging said positive clutch and releasing said brake independently of said impositive clutch.

4. A combination as defined in claim 3 in which said alternative means includes a second actuating valve having its inlet connected with said source, and a double check valve having inlets connected with both of said actuating valves and its outlet connected with said positive clutch and said brake.

5. In a drawworks which includes an output shaft, a low-drive shaft, a hoist drum, a pressure actuated positive clutch connection between said low-drive shaft and said hoist drum, a pressure actuated impositive clutch connection between said output shaft and said low-drive shaft, and a normally applied pressure released inertia brake on said low-drive shaft, the combination with said clutch connections and said brake of a control system comprising a source of fluid under pressure, a valve having its inlet connected to said source and its outlet connected with said positive clutch connection and said brake for engaging this clutch connection and releasing the brake when the valve is opened, a relay valve having its inlet connected to said source and its outlet connected with said impositive clutch connection, and means connecting the outlet of said first named valve with said relay valve for opening the latter after engagement of said positive clutch connection and release of said brake and thereby engaging said impositive clutch connection.

6. In a drawworks which includes an output shaft, a low-drive shaft, a hoist drum, a hydraulic brake, a pressure actuated positive clutch connection between said low-drive shaft and said hoist drum, a pressure actuated impositive clutch connection between said low-drive shaft and said output shaft, a normally applied pressure released inertia brake on said low-drive shaft and a connection between said low-drive shaft and said hydraulic brake, the combination with said clutch connections and said inertia brake of a control system comprising a source of fluid under pressure, an actuating valve having its inlet connected to said source and its outlet connected with said positive clutch connection and said inertia brake for engaging this clutch connection and releasing the brake when the valve is opened, a relay valve having its inlet connected to said source and its outlet connected with said impositive clutch connection, means connecting the outlet of said actuating valve with said relay valve for opening the latter after engagement of said positive clutch connection and release of said inertia brake and thereby engaging said impositive clutch connections, and means for engaging said positive clutch connection and releasing said inertia brake independently of said impositive clutch connection to enable said low-drive shaft to transmit torques to said hydraulic brake.

7. A combination as defined in claim 6 in which said last named means includes a second actuating valve having its inlet connected with said source, and a double check valve having inlets connected with both of said actuating valves and its outlet connected with said positive clutch connection and said brake.

References Cited in the file of this patent

UNITED STATES PATENTS

| 2,163,202 | Kegresse | June 20, 1939 |
| 2,316,131 | Cardwell | Apr. 6, 1943 |
| 2,536,483 | Young | Jan. 2, 1951 |
| 2,588,408 | O'Leary | Mar. 11, 1952 |
| 2,650,796 | Abraham | Sept. 1, 1953 |